United States Patent [19]
Wolk

[11] 3,926,783
[45] Dec. 16, 1975

[54] EBULLATED BED PROCESS

[75] Inventor: Ronald H. Wolk, Trenton, N.J.

[73] Assignee: Hydrocarbon Research, Inc., Morristown, N.J.

[22] Filed: Mar. 13, 1974

[21] Appl. No.: 450,804

Related U.S. Application Data

[63] Continuation-in-part of Ser. No. 245,469, April 19, 1972, abandoned.

[52] U.S. Cl. ............ 208/157; 208/127; 208/254 H
[51] Int. Cl.² ......................................... C10G 23/10
[58] Field of Search .......... 208/143, 157, 149, 127, 208/254 H

[56] References Cited
UNITED STATES PATENTS

| | | | |
|---|---|---|---|
| 2,443,673 | 6/1948 | Atwell | 208/149 |
| 2,662,091 | 12/1953 | Odell | 208/157 |
| 2,917,456 | 12/1959 | Ashley | 208/213 |
| 3,151,060 | 9/1964 | Garbo | 208/143 |
| 3,635,943 | 1/1972 | Stewart | 208/157 |
| 3,705,850 | 12/1972 | Wolk | 208/157 |

*Primary Examiner*—Herbert Levine

[57] ABSTRACT

A process which prevents the loss of fluidization in an ebullated catalyst bed when two liquid phases are present by adding a solid to the bed which will pass through the bed at a rate greater than the normal catalyst replacement rate for the main material in the bed. This added material will be constructed so as to allow the second liquid phase to preferentially be adsorbed on its surface.

1 Claim, 1 Drawing Figure

U.S. Patent   Dec. 16, 1975   3,926,783
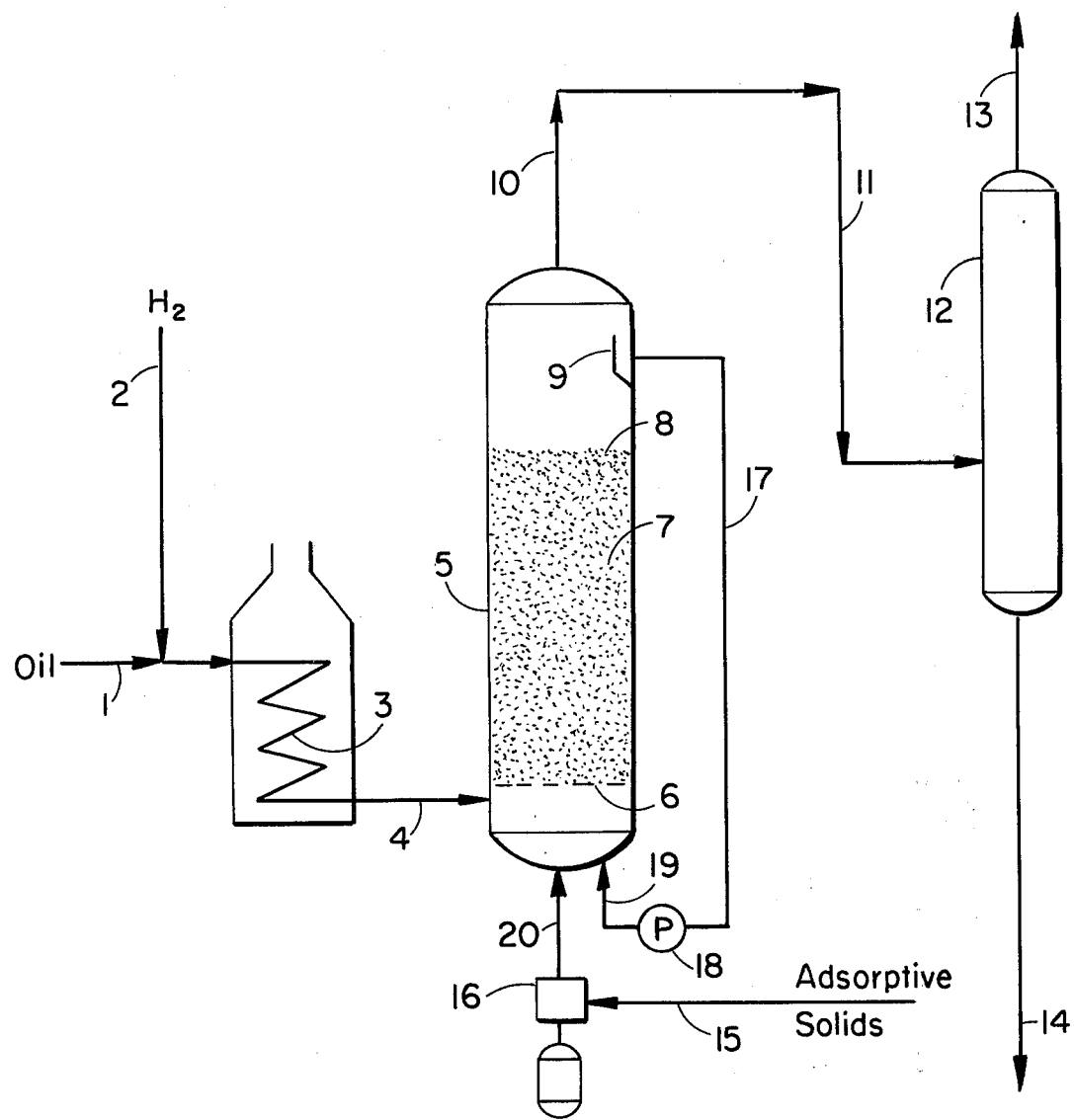

EBULLATED BED PROCESS

CROSS-REFERENCE TO RELATED APPLICATIONS

This application is a continuation-in-part of my copending application, Ser. No. 245,469, filed Apr. 19, 1972 now abandoned.

BACKGROUND OF THE INVENTION

This invention relates to an improved method of contacting a liquid and a gasiform material, particularly to effect a chemical or physical change.

Many different types of processes are in use and have been suggested for bringing about contact between liquid and gasiform materials. These processes involve combinations of various manipulative steps, e.g., upflow, downflow and horizontal flow of the liquid, concurrent and countercurrent flow of the gasiform material relative to the flow of liquid and the use of solid contact materials in the form of fixed, moving, and fluidized beds. These conventional processes have various problems or shortcomings connected with them. For example, they often suffer from poor contact between the liquid and gasiform materials and, if a solid contact material such as a catalyst is used, between the liquid and gasiform reactants and the surfaces of the particles of contact material. Another limiting factor often involved in these processes when a contact material is used is that the pressure drop across the bed of contact material rises rapidly after a certain point as the throughput rate of the liquid is increased. Still another limiting factor, which may occur in connection with certain processes, e.g., hydrocarbon conversion processes, is that deposits tend to form on the inner walls of the reactor and also on the surfaces of any contact particles which are used. This causes loss of activity if a catalytic contact material is being employed and may also cause plugging up of the reactor.

The handling of a solid, liquid and gas in a reaction zone has been described as the ebullated bed in U.S. Pat. No. Re. 25,770. For this reason, the ebullated process is particularly useful in carrying out various chemical reactions between liquid and gasiform materials in the presence of a solid catalyst. Some of these reactions are hydrogenation of hydrocarbon oils for refining purposes such as desulfurization or for hydrocracking the oil to gasoline and other valuable products, hydrogenation of animal and vegetable fats and oils so as to convert them to refined edible products, various halogenation processes, e.g., chlorination of toluene to form benzyl chloride and the chlorination of paraffin wax oxidation processes employing air or purified oxygen, e.g., the oxidation of acetaldehyde to acetic acid, sulfonation and nitration processes like reacting benzene vapor with sulfuric acid, and amidization processes such as contacting molten nicotinic acid with ammonia.

The ebullated bed process may be carried out under a wide variety of conditions. To obtain the advantages of this process it is only necessary that the liquid and gasiform materials flow upwardly through a mass of particulate material at a rate causing such mass to reach an ebullated state. In each ebullated system, variables which may be adjusted to attain the desired ebullation include the flow rate, density and viscosity of the liquid and the gasiform material, and the size, shape and density of the particulate material. However, it is a relatively simple matter to operate any particular process so as to cause the mass of contact material employed to become ebullated and to calculate the percent expansion of the ebullated mass after observing its upper level of ebullation through a glass window in the vessel or by other means such as liquid samples drawn from the vessel at various levels. In certain cases, liquid flow rates as low as 5 and as high as 500 gallons per minute per square foot of horizontal cross-section of the ebullated mass may be used. Similarly, the expanded volume of the ebullated mass may be several times the volume of the settled mass but expanding the settled mass by ebullation to a volume more than three times its original volume is rarely justified on technical or economic grounds.

Generally, the process conditions of temperature, pressure and ratio of liquid to gasiform material in any particular system operated in accordance with this invention may be similar to the conditions used in operating the system without ebullating the particulate material. However, when the ebullating technique is used, a greater degree of contact is obtained and, therefore, the time to bring about the desired chemical or physical change in any particular system will be shortened. The better contact achieved with ebullated solids is particularly beneficial in chemical reactions performed in the presence of solid catalysts which are expensive. In such chemical reactions, the ebullated catalyst not only will have longer life thereby curtailing cost regeneration but also will give better catalyst utilization thereby increasing the space velocity of the fluid reactants.

One of the difficulties in maintaining an ebullated or liquid fluidized bed of catalyst is that, under certain reaction conditions, the fluidization or ebullation of the bed is lost. It has been discovered that this is normally associated with the generation of a second liquid phase which is insoluble in the bulk of the reactor liquid and is of such a molecular configuration that it cannot be absorbed by the normal catalyst particles used within the bed.

SUMMARY OF THE INVENTION

It has been found, by adding a second solid to the bed at a rate sufficient to preferentially absorb the second liquid phase that proper bed ebullation can be maintained at all times. In other cases where the insoluble liquid has an extremely higher vapor pressure, it is possible to change the operating conditions of the system so that essentially all of the second liquid phase (water vapor) is present in the vapor phase. This is an alternate means of preventing catalyst bed defluidization. When the system is used in a hydroconversion reactor for the cracking of heavy residual oils to lighter boiling products, the invention is carried out by adding a second highly porous, finely divided solid to the feed material. This solid essentially passes through the bed with the feed and has no residence time similar to the catalyst in the bed. It is added at a rate sufficient to pick up all the insoluble materials being generated in the reactor. Normally, these large, second liquid phase, molecules adhere to the external surface of the catalyst particles and, when two or more come in contact, agglomeration begins. These agglomerates are then too large to be ebullated by the upflowing of fluid which normally is sufficient to carry out the ebullation of the unfluidized particles. The reaction conditions for this type of reactor would be quite broad and probably 700°–900°F, 500–3000 psig, 0.2–2.0 $V_f/hr/V_r$ and 1000–10,000 SCF/bbl of hydrogen.

DESCRIPTION OF THE DRAWING

The drawing shows an ebullated bed process for reacting hydrocarbons with hydrogen.

DESCRIPTION OF PREFERRED EMBODIMENT

Charge stock from line 1 is combined with hydrogen-containing gas from line 2. All of the fluid reactants flow through heater 3. The preheated gas-liquid mixture is thence transferred by line 4 to the bottom of reactor 5 which contains a mass of solid particles of hydrogenation catalyst supported on screen or perforated plate 6. When the process is not in operation, the catalyst mass has a stationary bed level 7. When, however, the process according to this invention is being carried out, the particles are in constant motion with respect to each other and the gross mass expands so that its upper boundary or upper level of ebullation is at 8. The reaction effluent discharging through outlet 10 flows through line 11 into separator 12 wherein it is separated into gasiform and liquid phases. A gasiform stream which comprises unreacted hydrogen and both gaseous and vaporized hydrocarbons is drawn off by line 13 and conventionally treated to recover hydrogen, hydrocarbon gases, gasoline, etc. The separated hydrogen may, of course, be used as part of the hydrogen feed to the system. The liquid drawn from separator 12 through line 14 is sent to product recovery for further treatment to obtain valuable products, e.g., by fractional distillation, catalytic cracking, lubricating oil refining, etc. Adsorption material may be continuously added to reactor 5 through line 15 as a slurry, pumped with pump 16 to system pressure and transferred in line 20 to the reactor. Internally recycle oil flow is obtained by collecting gas-free liquid in pan 9, transferring it through line 17 to ebullating pump 18, and pumping it back to the reactor through line 19.

In the hydroconversion of heavy asphaltene containing residual oils it is thought that the electrical charge which hold the asphaltenic molecules in suspension or solution in the bulk liquid are disturbed. This probably causes the formation of two mutually insoluble liquid phases. The second liquid composed of the heaviest and largest molecules present is small in quantity compared to the amount of total liquid in the reactor. It is characteristic of the second liquid phase that it absorbs on the most readily available surface which is the catalyst. If this material is not desorbed from the exterior catalyst surface many catalyst particles begin to agglomerate and fluidization is destroyed. For example, the normal hydroconversion catalyst has less than 0.05 cc/gram in pores greater than 10,000 Angstroms. In order for a solid to be useful for absorbing heavy molecules it should have more than 0.20 cc/gram in pores with diameters of at least 10,000 Angstroms. An example of such a solid is Kaiser "KCSA" alumina, manufactured by Kaiser Chemical Co. The requirement for the small solids to be carried out of the bed quickly is best met if the diameter of the solids is less than 10 percent of the diameter of the larger particles.

It was unexpected that the addition of the small solids having the abovementioned pore volume would aid the system to avoid defluidization.

The invention will now be further elucidated by examples which demonstrate its versatility in operations involving contact between gasiform and liquid materials to effect chemical and/or physical changes.

EXAMPLE I

In processing Venezuelan vacuum bottoms (Test Run A) having the inspections given in Table I at 75 percent conversion, it is found that the system is inoperable. This inoperability is observed when defluidization of the ebullated catalyst bed occurs after 120 hours on stream. When the reactor is opened, several large agglomerations of catalyst particles are found coked together. The large size of the agglomerates make it impossible to fluidize the catalyst bed at the velocities available from the ebullating pumps in the system. It is, therefore, impossible to maintain proper temperature control in the system.

The cause of this difficulty is found to be the presence of a second liquid phase within the reactor. The liquid material, which is obtained by benzene extraction of the agglomerated catalyst, is distilled. Carbon-hydrogen analyses of the 975°F plus fraction of this liquid shows that it has a much lower hydrogen content, 5.3 weight percent, than the comparable boiling range material leaving the reactor as product, 6.8 weight percent.

Test Run B is started at the same operating conditions as Test Run A with one difference. Kaiser KCSA minus 100 U.S. Standard mesh activated alumina, having an abnormally high macropore volume, is added to the unit through a slurry addition system. The velocities required to ebullate the 1/32 inch extrudate catalyst are high enough to carry the alumina out of the reactor zone so that it could be considered as a single-pass treatment. The run runs smoothly for 200 hours with no operating difficulties of any kind. Examination of the catalyst after the run is terminated shows it to be freeflowing with no agglomerates.

The products leaving the reactor are filtered to remove the alumina from the product liquid. Benzene extraction of the alumina is performed to recover the absorbed oil. A comparison of the hydrogen content of the 975°F plus fraction from the filtered liquid product and the liquid recovered from the alumina indicate a distinct difference. The material recovered from the alumina has a hydrogen content of 5.7 weight percent, whereas the material recovered from the filtered liquid has a hydrogen content of 6.8 weight percent.

The hydrogen content of the heavy liquid recovered from the alumina is somewhat higher than that recovered from the agglomerated catalyst from Test Run A. This may be caused by further degradation of the liquid contained within the lumps of agglomerated catalyst because they are retained within the reactor.

TABLE I

| FEED | Venezuelan Vacuum Bottoms | |
|---|---|---|
| °API | 6.0 | |
| Sulfur, W % | 2.8 | |
| Asphaltenes, W % | 19 | |
| V % Boiling above 975°F | 90 | |
| OPERATING CONDITIONS | Test Run B | Test Run A |
| Temperature, °F | 830 | 830 |

TABLE I-continued

| FEED | Venezuelan Vacuum Bottoms | |
|---|---|---|
| °API | 6.0 | |
| Sulfur, W % | 2.8 | |
| Asphaltenes, W % | 19 | |
| V % Boiling above 975°F | 90 | |
| OPERATING CONDITIONS | Test Run B | Test Run A |
| Hydrogen Partial Pressure, psig | 2250 | 2250 |
| Conversion, V % | | |
| Disappearance of 975°F plus Feed | 75 | 75 |
| Space Velocity, $V_{oil}/Hr/V_{reactor}$ | 0.75 | 0.75 |
| Catalyst | —1/32" CoMo on Alumina Extrudates— | |
| Catalyst Replacement Rate, Lbs/Bbl | 0.20 | 0.20 |
| Macropore Volume of Catalyst, cc/gm in Pores Larger than 10,000 Angstroms | 0.04 | 0.04 |
| Adsorbent Used | Kaiser 'KCSA' minus 100 U.S. Standard | — |
| Adsorbent Addition Rate, Lbs/Bbl | 0.10 | — |
| Macropore Volume of Adsorbent, cc/gms in Pores Larger than 10,000 Anstraoms | 0.22 | |
| Reactor Operability | Satisfactory - No catalyst agglomeration found | Unsatisfactory due to agglomeration of catalyst and loss of fluidization |

EXAMPLE II

One of the major difficulties with processes for the hydrocracking of middle distillate gas oils to naphtha is that the hydrocracking catalyst is poisoned by the nitrogen compounds contained in the feeds. Therefore, it is apparent that the removal of this nitrogen will improve catalyst life. One of the techniques that can be utilized to remove these nitorgen compounds is to pump the oil through an ebullated bed of 10 to 20 mesh silica gel.

Denitrogenation operations carried out on a 33.2°API Avery Island Virgin Gas Oil in an ebullated bed, as described in Table II, are satisfactory for lowering the total nitrogen content from 18 to 2 ppm. However, after several months on stream, it is noted that the efficiency of the system has deteriorated in that the nitrogen content of the effluent from the vessel had risen to 6 ppm. The unit is shut down and inspected. About 50 percent of the silica gel is found to be in loose agglomerates held together by surface water. Loss of efficiency is, therefore, obviously due to bypassing of half of the silica gel by the feed oil.

Before the unit is started up again, provisions are made to add a slurry of minus 100 U.S. Standard mesh activated alumina powder to the feed at a rate of 0.01 Lbs/bbl oil. This alumina preferentially adsorbs any water entering the unit and prevents the agglomeration of the silica gel particles. The water is preferentially adsorbed on the alumina instead of the silica gel because it is smaller in size and contains much larger average pores. Unit performance is satisfactory thereafter. The alumina is small enough to be carried out of the system at the velocities used to ebullate the silica gel. It is removed from the product stream by a hydrocyclone. The clarified denitrogenated gas oil is then hydrocracked in a conventional unit.

TABLE II

| Feedstock Inspections | |
|---|---|
| °API | 33.2 |
| Boiling Range | |
| IBP, °F | 492 |
| EP, °F | 634 |
| Carbon, W % | 86.55 |
| Hydrogen, W % | 13.39 |

TABLE II-continued

| Feedstock Inspections | |
|---|---|
| Sulfur, W % | 0.06 |
| Nitrogen, ppm | 180 |
| Aniline Point | 163.0 |
| Silica Gel | |
| Size | 10–20 mesh |
| Surface Area, M²/Gm | 750 |
| Pore Volume, cc/Gm | 0.40 |
| Bulk Density, Lbs/Ft³ | 44 |
| Average Pore Diameter, °A | 21 |
| Activated Alumina (Kaiser 'KCSA') | |
| Size | minus 100 U.S. Standard mesh |
| Surface Area, M²/Gm | 250 |
| Pore Volume, cc/Gm | 0.70 |
| Bulk Density, Lbs/Ft³ | 40 |
| Average Pore Diameter, °A | 112 |
| Denitrogenation Operating Conditions | |
| Temperature, °F | 85 |
| Pressure, psig | 150 |
| Liquid Velocity through the bed, GPM/Ft² | 15 |
| Bed Expansion, % | 45 |

I claim:

1. A process for avoiding the loss of fluidization of an ebullated catalyst bed resulting from the formation of two mutually insoluble liquid phases during the catalytic hydroconversion of heavy asphaltene containing residual oils wherein the catalyst is of a size between 60 mesh and one-half inch diameter and the hydroconversion is carried out in a reaction zone at temperatures between 700° and 900°F, at pressures between 500 and 3000 psig with a space velocity of the residual oil between 0.2 and 2.0 volumes of feed per hour per volume of reaction zone and wherein one of the liquid phases has the heaviest and largest molecules and is insoluble in the other liquid phase, said liquid phase having the heaviest and largest molecules being a minor portion of the total liquid in the reaction zone:

a. adding a second particulate solid which is alumina to said ebullated bed at a rate to absorb the liquid phase that defluidizes the catalyst wherein said second particulate solid has a diameter of less than 10 percent of the diameter of said catalyst and has more than 0.2 cc/gram of its pore volume in pores with diameters of at least 10,000 angstroms; and b. passing said second solid upwardly through said catalyst and out of said bed with the liquid phase that would defluidize the ebullated catalyst bed.

* * * * *